(12) United States Patent
Nielsen et al.

(10) Patent No.: US 12,069,439 B2
(45) Date of Patent: *Aug. 20, 2024

(54) ALIGNMENT BETWEEN CHARGING ELEMENTS OF A HEARING DEVICE AND A CHARGER

(71) Applicant: GN Hearing A/S, Ballerup (DK)

(72) Inventors: Henrik Nielsen, Roskilde (DK); Søren Davids, Jyllinge (DK); Thomas John Chappell, Evanston, IL (US); Anders Hjermø Michaelsen, Bagsværd (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,611

(22) Filed: Jul. 10, 2023

(65) Prior Publication Data

US 2023/0353960 A1 Nov. 2, 2023

Related U.S. Application Data

(63) Continuation of application No. 17/411,012, filed on Aug. 24, 2021, now Pat. No. 11,792,585, which is a
(Continued)

(51) Int. Cl.
*H04R 25/00* (2006.01)
*H04R 31/00* (2006.01)

(52) U.S. Cl.
CPC ........... *H04R 25/60* (2013.01); *H04R 25/658* (2013.01); *H04R 31/00* (2013.01)

(58) Field of Classification Search
CPC ...... H04R 25/60; H04R 25/658; H04R 31/00; H04R 1/1016; H04R 2225/025;
(Continued)

(56) References Cited

U.S. PATENT DOCUMENTS 6,748,093 B2 * 6/2004 Tøpholm ............. H04R 25/654
381/328
6,920,414 B2 * 7/2005 Tøpholm ................ G06F 30/00
29/896.21
(Continued)

FOREIGN PATENT DOCUMENTS

DE 29718104 1/1998
DE 102012218663 4/2014

OTHER PUBLICATIONS

Foreign Provisional Opinion with Partial Search Report for EP Appln. No. 23215187.8 dated Feb. 20, 2024.
(Continued)

*Primary Examiner* — Angelica M Mckinney
(74) *Attorney, Agent, or Firm* — Vista IP Law Group, LLP

(57) ABSTRACT

A method of configuring a custom insert of a charger, wherein the custom insert is for aligning a first charging element of a hearing device and a transmitter charging element of a charger, includes: obtaining a digital three-dimensional hearing device model comprising a representation of the first charging element; obtaining a digital three-dimensional charger model comprising a representation of the transmitter charging element; obtaining a digital three-dimensional insert model; obtaining a digital cavity representing a cavity in the custom insert; and creating a custom digital three-dimensional insert model based on the digital cavity and the digital three-dimensional insert model, such that the representation of the first charging element in the digital three-dimensional hearing device model and the representation of the transmitter charging element in the three-dimensional charger model, are aligned.

20 Claims, 6 Drawing Sheets

Related U.S. Application Data continuation of application No. 16/700,638, filed on Dec. 2, 2019, now Pat. No. 11,202,157.

(58) Field of Classification Search
CPC .......................... H04R 1/1025; H04R 25/554; H04R 2225/31; H04R 2460/17; H04R 25/602; H04R 25/55; H04R 25/556; H04R 2225/33; H04R 1/1066; H04R 25/652; H04R 25/609; H04R 2420/07; H02J 7/0044; H02J 50/10; H02J 50/90; H02J 2207/30; H02J 50/005; H02L 7/0045; H02L 7/0044

See application file for complete search history.

(56) References Cited

U.S. PATENT DOCUMENTS

| | | | | |
|---|---|---|---|---|
| 7,050,876 B1* | 5/2006 | Fu | .......................... | B33Y 50/02 |
| | | | | 700/98 |
| 7,694,418 B2* | 4/2010 | Topholm | .............. | H04R 25/658 |
| | | | | 29/896.21 |
| 11,202,157 B2* | 12/2021 | Nielsen | ................ | H04R 1/1066 |
| 11,792,585 B2* | 10/2023 | Nielsen | ................ | H04R 1/1025 |
| | | | | 381/323 |
| 2008/0136369 A1 | 6/2008 | Klemenz | | |
| 2009/0200984 A1 | 8/2009 | Meincke et al. | | |
| 2018/0123367 A1* | 5/2018 | Higgins | ............. | H01R 13/2414 |
| 2019/0239004 A1 | 8/2019 | Mueller et al. | | |
| 2020/0260176 A1 | 8/2020 | Baltensperger et al. | | |
| 2021/0168537 A1 | 6/2021 | Nielsen et al. | | |
| 2022/0191628 A1 | 6/2022 | Nielsen et al. | | |

OTHER PUBLICATIONS

Extended European Search Report dated May 19, 2020 for EP Appln. No. 20150699.5.

"Interface and Positioning Concept for Inductive Charging of Hearing Aids", ip.com Journal, ip.com Inc., West Henrietta, NY, US, Sep. 11, 2009.

Non-Final Office Action for U.S. Appl. No. 16/700,638 dated May 25, 2021.

Amendment Response to NFOA for U.S. Appl. No. 16/700,638 dated Aug. 13, 2021.

Non-Final Office Action for U.S. Appl. No. 17/411,012 dated Dec. 27, 2022.

Amendment Response to NFOA for U.S. Appl. No. 17/411,012 dated Mar. 14, 2023.

Notice of Allowance for U.S. Appl. No. 17/411,012 dated Apr. 17, 2023.

Foreign Written Opinion for EESR for EP app No. 23215187 dated May 15, 2024.

* cited by examiner even if an exact description of a user's ear cannot be provided before the hearing device is used.

ALIGNMENT BETWEEN CHARGING ELEMENTS OF A HEARING DEVICE AND A CHARGER

RELATED APPLICATION DATA

This application is a continuation of U.S. patent application Ser. No. 17/411,012 filed on Aug. 24, 2021, pending, which is a continuation of U.S. patent application Ser. No. 16/700,638 filed on Dec. 2, 2019, now U.S. Pat. No. 11,202,157. The entire disclosure of the above application is expressly incorporated by reference herein.

FIELD

The present disclosure relates to a method for alignment of a receiver charging element of a hearing device and a transmitter charging element of a charger. The present disclosure further relates to a kit comprising the charger comprising the transmitter charging element and the hearing device comprising the receiver charging element, wherein the two charging elements are aligned.

BACKGROUND

Rechargeable hearing aids are gaining popularity because they require low maintenance compared to traditional hearing aids with alkaline batteries. The rechargeable hearing aids do not generate an extra cost for a user, as there is no need for purchasing a new battery every time an old battery is drained. Furthermore, the rechargeable hearing aids have other benefits, they are watertight, robust, environmentally friendly, and allow for new architectures. The rechargeable hearing devices are typically charged wirelessly.

Wireless charging has various advantages, it is simple as a charging device may simply be placed at a charging pad. Furthermore, mechanical strain on a charging port is reduced, as there is no plug to be plugged and unplugged every time. Additionally, wireless charging is constantly growing so it will be more and more common that wireless charging pads will be installed in various places so that users can simply drop their device for charging. This applies to standard devices which do not require special, i.e. custom, types of charging pads.

On the other hand, wireless charging is in general slower than wired charging as, often, a charging device and a charger may not have a good energy transfer due to low efficiency, and especially if the charging device has a special shape, like a custom-made hearing device. Due to their specific shape, hearing devices may require a charging station, and not a simple charging pad. Therefore, there is a need for an improved method for ensuring optimal charging of a hearing device in a charger.

SUMMARY

It is an object to provide a method for alignment between a receiver charging element and a transmitter charging element to thereby provide efficient power transfer between the two charging elements.

It is a further object to provide a method for aligning a receiver charging element with respect to the transmitter charging element, and vice versa, to thereby bring the two charging elements close to each other in all three dimensions. When the two charging elements are close to each other, efficient power transfer between the two charging elements is provided.

It is yet a further object to provide a method for alignment between a receiver charging element and a transmitter charging element to thereby allow for miniaturization of a charger and a hearing device, and to further provide the hearing device which is more tolerant to manufacturing inaccuracy.

It is a further object to provide a kit comprising a charger and a hearing device, where the hearing device can be easily removed from the charger and placed in the user's ear with one movement.

It is yet a further object to provide a kit comprising a charger and a hearing device, where the hearing device can be easily removed from the user's ear and placed in the charger with one movement In a first aspect, a method for alignment of a receiver charging element (Rx) of a hearing device and a transmitter charging element (Tx) of a charger is provided. The hearing device is a custom rechargeable hearing device designed to be worn by a user. The charger comprises a custom insert, the custom insert being configured to receive the hearing device. The method comprises obtaining a digital scan of the user's ear shape. The method further comprises creating a digital three-dimensional (3D) hearing device model based on the digital scan of the user's ear shape. The position of the receiver charging element Rx is configured to be added to the digital 3D hearing device model. Further, a digital 3D charger model is provided or obtained and the position of the transmitter charging element Tx is configured to be added to the digital 3D charger model. A generic digital 3D insert model is provided or obtained and a digital cavity is created in the generic digital 3D insert model. The digital cavity is based on the digital 3D hearing device model to thereby obtain a custom digital 3D insert model. The cavity is configured to receive the hearing device. Alignment between the receiver charging element Rx in the digital 3D hearing device model and the transmitter charging element Tx in the 3D charger model is ensured to thereby maximize coupling between the transmitter charging element Tx and receiver charging element Rx.

The method may thereby comprise obtaining the digital three-dimensional hearing device model, wherein the digital three-dimensional hearing device model is based on the digital scan of an ear of the user, the digital three-dimensional hearing device model comprising a representation of the receiver charging element Rx; obtaining the digital three-dimensional charger model, the digital three-dimensional charger model comprising a representation of the transmitter charging element Tx; obtaining the generic digital three-dimensional insert model; obtaining the digital cavity representing the cavity in the custom insert to be made for receiving the hearing device; and creating the custom digital three-dimensional insert model based on the digital cavity and the generic digital three-dimensional insert model, wherein the custom digital three-dimensional insert model is created such that (1) the representation of the receiver charging element Rx in the digital three-dimensional hearing device model and (2) the representation of the transmitter charging element Tx in the three-dimensional charger model, are aligned.

The custom insert may be configured to receive the hearing device so that the hearing device only can be placed correctly in one position. The position of the receiver charging element Rx in the hearing device with relation to the transmitter charging element Tx in the charger is thus controlled in the use situation.

The method as described above and as specified below may be performed by an apparatus, such as a design software, a workstation, etc., and/or by a human.

The transmitter charging element Tx is comprised in the charger and have a connection point to a power supply source. The charger, i.e., the transmitter charging element is typically driven by electric power from a power source and generates a time-varying electromagnetic field, which transmits power across space and towards the receiver charging element Rx in the hearing device. The power supply source may be an electric current supply source, a solar power source, a light source, a hand driven dynamo or the like.

The transmitter charging element may be positioned in the bottom of the charger. In this embodiment, the receiver charging element of the hearing device will be positioned on top of the transmitter charging element, once the hearing device is placed in the custom insert. Alternatively, the transmitter charging element may be positioned in the lid of the charger. In this scenario, the receiver charging element of the hearing device will be positioned below the transmitter charging element, once the hearing device is placed in the custom insert.

The receiver charging element Rx is comprised in the hearing device and is configured to extract power from the electromagnetic field produced by the transmitter charging element. The receiver charging element is typically placed in the outer part of the hearing device, i.e. the part facing towards the user's surroundings, when the hearing device is worn by the user. The receiver charging element is typically arranged on a faceplate of the hearing device. The receiver charging element Rx is coupled or connected to a rechargeable battery of the hearing device. The receiver charging element Rx is configured to charge the rechargeable battery of the hearing device.

The transmitter charging element Tx may transfer energy wirelessly to the receiver charging element. During the wireless energy transfer, one of the important factors which defines efficiency of the charging process is alignment between the transmitter charging element and receiver charging element. Normally, for maximum power transfer and therefore fast charging, the transmitter charging element and receiver charging element may be tightly coupled. Alternatively, the coupling between the charging elements may be loose, i.e., the receiver charging element may be placed anywhere in the electromagnetic field of the transmitter charging element. In this scenario, the alignment between the charging elements may be poor and only a portion of the electric flux of the transmitter charging element links to the receiver charging element.

Alignment between the receiver charging element and transmitter charging element may be obtained when the receiver charging element and transmitter charging element are close to each other, such as as close as physically possible to each other, such as within a predetermined distance from each other, such as within a predetermined distance from each other in a z-direction, such as center-aligned in a x and/or y-direction.

Alignment between the receiver charging element and transmitter charging element determines coupling efficiency of a charging system comprising the charger and hearing device. Coupling efficiency (CE) can be computed from the basic efficiency formula $$CE = P_{out}/(P_{out} - P_{loss})$$

where $P_{out}$ is the power supplied by a power supply source and $P_{loss}$ is the power lost during the power transfer. Maximum efficiency of an ideal system is 100%. However, power loss occurs at various elements of the system in addition to losses due to misalignment of the charging elements. Optimal efficiency may be defined as efficiency higher than 10%, such as higher than 20%, such as higher than 25%, such as higher than 30%. In a well-optimized charging system, the wireless charging can be as efficient as a wired charging. Optimal coupling is important because it provides fast charging and lower power consumption.

The hearing device is a custom rechargeable hearing device designed to be worn by a user. In the present context, the term custom device is intended to mean that the device is made specifically to fit an individual's ear canal, i.e. the ear canal of the hearing device user. Since each person's ear has a unique shape, the custom hearing device typically cannot be worn by another person.

The hearing device may be any custom hearing device providing sound to a user. The hearing device may include all sizes and form factors of custom hearing devices. The hearing device may comprise a shell and a faceplate. In the present context, the hearing device may be a hearing aid programmed/configured to compensate for a hearing loss of the user who is a hearing-impaired person. The hearing device may have additional features, e.g. the hearing device may be configured to stream audio content to the user, it may be configured for user's speech extraction, etc. The hearing device may be an in-the-ear (ITE) hearing aid or be a completely-in-the-canal (CIC) type hearing aid in which the hearing device is provided in the ear of the user. Typically, hearing device components, such as a processing unit, a battery, a wireless communication unit, one or more microphones, etc. may be distributed on the faceplate or in the shell. A speaker of the hearing device may be arranged in the shell or on the shell. The speaker may be arranged in/on the end of the shell opposite to the faceplate. The speaker may point towards the tympanic membrane of the user, when the hearing device is arranged in its operational position in the ear of the user. The hearing device may comprise two hearing aids allowing for binaural hearing. These binaural hearing devices may comprise the same or different components or modules.

The rechargeable hearing device is configured to be charged by the charger. The rechargeable hearing device may comprise a rechargeable battery. The rechargeable battery may then power the hearing device components. The battery may be built into the hearing device. The battery may be arranged in the faceplate of the hearing device. The battery may be arranged inside the shell of the hearing device, i.e. within the volume of the hearing device shell where other components may be arranged.

The charger is configured to charge the hearing device. The charger may comprise a housing for securing the hearing device when the hearing device is charging the battery. The charger may comprise a support structure comprising the transmitter charging element Tx. The charger may comprise a lid. The support structure may be the lid of the charger. The lid may comprise or be connected to the transmitter charging element. As an alternative the support structure may be a movable arm comprising the transmitter charging element Tx. The movable arm may be connected to the charger housing or lid. The user may move the movable arm into a predefined position, i.e. a charging position, on top of the hearing device and thereby connecting the transmitter charging element Tx and the receiver charging element Rx. The predefined position may be temporarily locked position. The charger itself may be a rechargeable device configured to be charged by means of wireless or wired charging.

The charger comprises the custom insert which is configured to receive the hearing device. The custom insert comprises at least one cavity for receiving the hearing device. The cavity may have a mirrored geometry of the hearing device, i.e. the cavity may be an impression of the hearing device. The cavity may be configured to receive the hearing device so that the hearing device only can be placed correctly in one position. The position of the receiver charging element Rx in the hearing device with relation to the transmitter charging element Tx in the charger is thus controlled in the use situation.

In this specification, the charger or any of its components, such as the insert and the transmitter charging element, unless specifically stated otherwise, may refer to a charger or its component(s) that is already produced, or may refer to a charger or its component(s) that is to be made, or to both. Similarly, in this specification, the hearing device or any of its components, such as the receiver charging element, unless specifically stated otherwise, may refer to a hearing device or component(s) that is already produced, or may refer to a hearing device or component(s) that is to be made, or to both.

According to the first aspect, a digital scan of the user's ear shape is obtained. The digital scan is a digital representation of a three-dimensional (3D) image of the ear shape. The digital scan comprises data related to the shape and appearance of the ear. The digital scan comprises a 3D representation of at least a part of the outer ear, such as at least a part of the ear canal and the concha. In the present context, the digital scan may either be a digital scan of a physical impression of the user's ear, or the digital scan can be obtained by directly scanning the ear using an ear scanner. In one example, a physical impression of the user's ear is made by arranging the impression material in the user's ear and then the physical impression is scanned in a 3D scanner to thereby provide the digital scan of the user's ear. In another example, a 3D scanner may directly scan the user's ear shape and provide the digital scan.

The user's ear shape obtained by the 3D scanning may comprise the shape of at least a part of the user's ear canal and/or outer ear parts surrounding the ear canal, such as the concha, tragus, antitragus, and/or incisura intertragica. The digital scan may comprise information about at least a part of the shape of one or more of these parts of the ear.

Once the digital scan is obtained, a digital 3D hearing device model is created based on the digital scan. The digital hearing device model is a geometrical representation of the ear surfaces and may be created by a specialized software by importing the digital scan to thereby create the digital 3D hearing device model of the custom hearing device. Once the digital 3D hearing device model is created, it can be sent to a 3D printer for printing of the hearing device shell.

The position of the receiver charging element is configured to be added to the digital 3D hearing device model. Typically, the receiver charging element is arranged in the faceplate together with other electronic components of the hearing device. The position of the receiver charging element may be determined on the basis of miniaturization rules. Namely, a person designing the hearing device may design the faceplate and arrange the electronic components such that the device size is minimized. Alternatively, the faceplate is a pre-designed part where the electronic components have a fixed position. The position of the receiver charging element may partly determine the geometry of the custom insert. When the position of the receiver charging element is added to the digital 3D hearing device model it may form part of the model and influence further method steps towards the alignment of the receiver charging element and transmitter charging element.

Further, a digital 3D charger model is provided or obtained. Typically, the digital 3D charger model is a geometrical representation of the charger and comprises physical dimensions of the charger and possibly the lid.

The position of the transmitter charging element is configured to be added to the digital 3D charger model. The transmitter charging element may be positioned in the bottom of the charger and/or in the lid of the charger and/or a support structure connected to the charger. The position of the transmitter charging element may be changed during the alignment process for ensuring alignment between the transmitter charging element and the receiver charging element. The position of the transmitter charging element in the charger may define the position of the cavity in the custom insert. Typically, the digital 3D charger model and the position of the transmitter charging element are predefined and may be provided by a third party.

A generic digital 3D insert model is then provided or obtained. A generic insert represented by the generic digital 3D insert model may fit inside the charger. The generic 3D insert model may be a geometrical representation of the generic insert. The generic insert may be a plate having approximately the same dimensions as an inside cavity of the charger housing. The generic insert may be a plate having approximately a thickness of at least 0.5 mm, or between 1-2 mm, or between 1-1.5 mm or 1.5 mm. The generic insert may be made of a plastic material.

All the models may be provided and/or created and/or obtained using a specialized software program. The specialised software program may be configured for performing digital modifications to computer aided design (CAD) files. The digitally modified CAD files may then be manufactured by rapid prototyping, such as by computer aided manufacturing (CAM) machines, such as 3D printers etc. This may apply to all the digital models in the present method.

Once the 3D hearing device model, 3D charger model, and 3D generic insert model are provided or obtained, the digital cavity can be created. Based on the digital cavity, a physical cavity for receiving the hearing device may then be created in the custom insert. The digital cavity is created in the generic digital 3D insert model. The digital cavity is based on the digital 3D hearing device model to thereby obtain a custom digital 3D insert model. The digital cavity may be created based on the position of the transmitter charging element in the digital 3D charger model. The position of the digital cavity in the custom 3D insert model may be determined by the position of the transmitter charging element in the 3D charger model and/or by the position of the receiver charging element in the 3D hearing device model. The digital cavity may define the volume which may be formed in the generic insert during the manufacturing of the custom insert. Alternatively, the 3D custom insert model may be sent to a 3D printer for printing the custom insert comprising at least one cavity. The printed custom insert may then be arranged in the charger.

After obtaining the custom 3D insert model, further modelling is performed in order to ensure alignment between the receiver charging element in the digital 3D hearing device model and the transmitter charging element in the 3D charger model to thereby maximize coupling between the receiver charging element and the transmitter charging element. Alignment between the two charging elements can be ensured or improved in various ways. In one embodiment, the 3D hearing device model can be used to optimize the position of the digital cavity in the custom insert and to thereby adjust, such as fine tune, the position of the receiver charging element in the hearing device with respect to the transmitter charging element in the charger. In another embodiment, the position of the transmitter charging element in the charger is optimized such that the transmitter charging element is as close as possible to the receiver charging element in the hearing device when the hearing aid is placed in the charger and the transmitter charging element is placed in a charging position. When positioning the transmitter charging element, physical interference between the receiver charging element and transmitter charging element and other physical parts of the hearing device and the charger is to be taken into account. Proper positioning of the charging elements also ensures that the hearing device, e.g. the faceplate, and the charger lid or support structure do not collide and possibly prevent proper charging and/or closing of the charger. In yet another embodiment, both the position of the transmitter charging element and the position of the receiver charging element can be adjusted when aligning. The position of the receiver charging element is adjusted by optimizing the position of the digital cavity on the basis of the 3D hearing device model.

By having the custom cavity defined in the custom insert and by aligning the charging elements in the charger and hearing device, charging speed of the hearing device may be improved compared to non-custom chargers, as the position of the receiver charging element in the hearing device with respect to the transmitter charging element in the charger is controlled. Furthermore, power consumption is decreased as the efficiency of the charging process is increased.

The method provides a guidance on how to align charging elements in the charger and the hearing device. Adjusting the relative position of the charging elements allows for a smaller charger compared to chargers in which the alignment between the charging elements was not performed.

The method according to the first aspect can be applied to a charging system comprising a charger and a hearing device in which charging of the hearing device by the charger is performed wirelessly and where alignment between the charger and the hearing device has an impact on the efficiency of the charging system. For the wireless power transfer a number of different technologies can be used such as inductive coupling, resonant inductive coupling, capacitive coupling, magneto-dynamic coupling, microwaves, light waves, etc. The rechargeable batteries may be lithium-ion batteries, a silver-zinc battery, etc.

The method according to the first aspect can be applied to a charging system comprising a charger and a hearing device in which charging of the hearing device by the charger is performed by terminal or contact charging and where alignment between the charger and the hearing device has an impact on the efficiency of the charging system. Terminal or contact charging can use rechargeable batteries. For the terminal or contact power transfer a number of different technologies and battery types can be used, such as alkaline batteries, galvanic charging etc.

In some embodiments, the method further comprises controlling the position of the receiver charging element in the digital 3D hearing device model with respect to the position of the transmitter charging element. The position of the receiver charging element with respect to the transmitter charging element may be controlled by controlling the position of the digital cavity in x, y, and/or z direction. By controlling the position of the digital cavity, the position of the receiver charging element with respect to the transmitter charging element is controlled. By controlling the position of the receiver charging element relative to the transmitter charging element further alignment between the two is achieved and thereby the efficiency of the charging process is increased. The positioning of the digital cavity may be performed by the specialized software and typically before the custom insert is manufactured.

In some embodiments, the custom digital three-dimensional insert model may be defined by a top surface extending through a plane, wherein the position of the receiver charging element is controlled by controlling the position of the digital cavity along a direction parallel to the plane of the custom digital three-dimensional insert model. The plane being an xy plane and the direction parallel to the plane corresponding to the x or y direction or a combination thereof.

The custom digital 3D insert model may be defined by a top surface extending through a plane and a vertical axis, the vertical axis being perpendicular to the plane or the top surface, wherein the position of the receiver charging element is controlled by controlling the position of the cavity along a direction parallel to the plane or top surface of the custom digital 3D insert model. According to this embodiment, a height of a portion of the hearing device protruding from the digital cavity above the top surface is constant, i.e. it does not change with the digital cavity positioning. The height of a portion of the hearing device protruding from the digital cavity above the top surface may be 3-10 mm, or 5-8 mm or 6-7 mm or 7 mm. Hereby it may be easy for the user to grab the hearing device and take it out of the charger.

By controlling the position of the digital cavity in the custom digital 3D insert model, an angle between the receiver charging element and transmitter charging element is controlled. Optimally, the receiver charging element and transmitter charging element may need to be arranged in parallel to each other. Tolerances up to ±20 degrees offset from parallel may be allowed.

In some embodiments, the method may further comprise adjusting the position of the transmitter charging element with respect to the receiver charging element. The position of the transmitter charging element in the charger may be adjusted by a charger manufacturer to thereby ensure correct functionality of the charger. The manufacturer may use the digital 3D models of the hearing device and the custom insert to perform the adjustment of the transmitter charging element in the charger to match or be aligned with the receiver charging element of the hearing device. Alternatively, an adjustment tool placed in the charger may be used to thereby adjust the position of the transmitter charging element to match the position of the receiver charging element in the hearing device. According to this embodiment, the position of the transmitter charging element may be adjusted after the cavity for receiving the hearing device is created. Adjusting the position of the transmitter charging element in the charger may be performed after manufacturing the custom insert. Alternatively, both the position of the digital cavity and the position of the transmitter charging element may be adjusted. This allows for miniaturization of the charger, and design and manufacturing of custom hearing device is less challenging regarding the tolerances. Further, adjusting the position of both the transmitter charging element and the digital cavity allows for a faster design and manufacture of the hearing device and it prevents collisions between the transmitter charging element in the charger and parts of the hearing device, e.g. a pull out wire or a volume control button at the faceplate of the hearing device. A larger custom hearing device may also be allowed if the position of the transmitter charging element in the charger is controlled.

In some embodiments, adjusting the position of the transmitter charging element is performed by adjusting the position of the transmitter charging element in at least one of x or y or z directions. This adjustment may be performed manually with an external tool, or with the adjustment tool placed in the charger. Alternatively, the transmitter charging element may be adjusted completely manually by an operator. The transmitter charging element may be moved in some or all three directions at the same time. The transmitter charging element may be embedded in a charging tower attached to the lid of the charger and then the charging tower may be moved in any direction thereby moving the transmitter charging element with respect to the receiver charging element. This large freedom in positioning of the transmitter charging element in the charger allows for further improvements in charging efficiency and power consumption. The charging tower may be a protrusion extending from an inside surface of the lid toward the position of the receiver charging element when the hearing aid is placed in the charger. The receiver charging element may be placed in/on a surface or an end surface of the protrusion. Wherein the surface or an end surface of the protrusion may be close to the receiver charging element when the hearing aid is placed in the charger and the lid is closed.

In some embodiments, the method further comprises creating a digital 3D gap in the digital cavity of the digital 3D custom insert model, the digital 3D gap defining an air-gap between the digital cavity and the digital 3D hearing device model. The digital 3D gap may be created by the specialized software program by offsetting surfaces of the digital cavity from the digital 3D hearing device model. The air-gap may mainly be at the upper half of the digital cavity to allow for an easy insertion/removal of the hearing device into/from the charger. The 3D gap formed in the insert makes it easy and intuitive for the user to remove the hearing device from the charger and the custom insert and place it in the ear with one movement and without a need for reorientation of the hearing device. Further, the defined air-gap ensures that the hearing device is not too tightly inserted in the custom insert and/or to ensure that it is not difficult to take the hearing device out from the charger and to place it back for charging. The digital 3D gap may be created by increasing a size of the digital cavity of the custom 3D insert model. The digital 3D gap may be created by applying transformations or modifications to the created digital cavity. These transformations may include changing the width of the digital cavity, carving one or more sides of the digital 3D cavity mainly in the upper half of the cavity etc. As a result of the digital cavity transformations, the digital 3D gap is formed to make it possible for the user to take out the hearing device from the cavity in the charger insert.

In some embodiments, the hearing device is an inductively chargeable hearing device. The inductively chargeable hearing device is inductively coupled to the charger when charging the battery of the hearing device in the charger.

In some embodiments, the receiver charging element may be a receiver coil and the transmitter charging element may be a transmitter coil. The receiver coil and/or the transmitter coli may comprise at least one magnetic coil thereby enabling inductive charging. When placed over each other, the two coils couple inductively and can be modelled as a two-coil transformer with an air core. The receiver charging element coil(s) and transmitter charging element coil(s) may have the same size or they may have different sizes. For an efficient power transfer, the coils may be matched in frequency and/or in phase and be positioned close to each other and in parallel. As distance and parallelism between the coils mainly depend on the shape of the hearing device and the custom insert, it is therefore important to design the custom insert such that efficiency of the energy transfer is improved.

Alternatively, the charging elements may form a galvanic contact. In yet one alternative, the charging elements may form an optical charging interface. In yet one alternative, the charging elements may form capacitive coupling. In this embodiment, the charging elements may be in a form of metal electrodes.

In some embodiments, the custom insert may be configured to have a first cavity and a second cavity for receiving a first custom rechargeable hearing device and a second custom rechargeable hearing device, respectively, i.e. a first cavity for receiving the custom rechargeable hearing device, and a second cavity for receiving a second custom rechargeable hearing device. Therefore, a first digital cavity and a second digital cavity may be created in the generic 3D insert model. The first and second rechargeable hearing device may differ from each other and thereby the respective cavities may also differ from each other to accommodate the corresponding hearing devices. The first and second hearing device may correspond to the user's left and right hearing aid, respectively. Both of the cavities may be formed in accordance to the method of the first aspect. The cavities may be formed simultaneously or in two separate iterations. By having two cavities in the custom insert, efficient charging of both, left and right, hearing devices is enabled.

In some embodiments, the hearing device may comprise a faceplate, and the faceplate may comprise the receiver charging element. The faceplate may be arranged onto/into the hearing device after a custom shell of the device is produced. The faceplate may be represented by a digital 3D faceplate model. The digital 3D faceplate model may be obtained and used to create the digital 3D hearing device model. The digital 3D faceplate model may comprise the position of the receiver charging element. An arrangement of the receiver charging element and other components on the faceplate may be predefined or it may depend on the size of the hearing device. The faceplate may be a generic faceplate, where all the components are in a fixed position when delivered from the manufacturer of the faceplate. The faceplate may be a custom faceplate, where the components are to be placed in position in the faceplate by an operator or designer. The faceplate may be selected from different sizes of faceplates and/or from the selection and/or quality of the components in the faceplate. The operator assembling the hearing device may select the faceplate for the custom shell based on the size of the shell. An operator or designer of the faceplate may decide the position of the receiver charging element, depending on the shell design and in order to miniaturize the hearing device. The faceplate may comprise microphone(s), wireless communication unit, processor, and other electronics required for functioning of the hearing device and/or hearing aid. Once assembled, the arrangement of the receiver charging element on the faceplate may not be changed.

In some embodiments, the charger may comprise a lid. The lid may ensure that the hearing device is securely placed inside the charger when the lid is closed. By having the charger lid, the charger together with the hearing device inside it may be transported while the charging process takes place. The charger itself may be rechargeable. The digital 3D charger model may comprise a digital 3D lid model.

In some embodiments, the charger lid may comprise at least one charging tower, the charging tower comprising the transmitter charging element. The charging tower may be movably arranged on the lid so that its position may be adjusted in order to match the position of the receiver charging element in the hearing device. Alternatively, the transmitter charging element may be movably arranged on/in the charging tower so that its position may be adjusted in order to match the position of the receiver charging element in the hearing device. Yet as an alternative, the charging towers may be stationary, without a possibility to be moved. In this scenario, the alignment of the receiver charging element is performed by designing the custom insert such that the two charging elements are matched, such as within a predetermined distance from each other. The lid of the charger may be closed in order for the charging to be efficient. The lid of the charger may be open when placing and removing the hearing device in the cavity of the charger insert.

In some embodiments, creating the digital cavity for receiving the hearing device in the custom digital 3D insert model may comprise digitally removing one or more undercuts/negative draft in/from the digital cavity. By digitally removing any undercuts or negative drafts, it is ensured that the hearing device can be placed and removed from the cavity. If any undercuts or negative drafts are not removed, the hearing device cannot be placed or removed from the cavity, as material in the insert is blocking the free passage of the hearing device in the cavity.

In a second aspect, a kit includes a charger and a hearing device. The charger comprises a transmitter charging element and a custom insert being configured to receive the hearing device. The hearing device is a custom rechargeable hearing device designed to be worn by a user and comprises a receiver charging element. The transmitter charging element and receiver charging element are aligned using the method according to any of the embodiments according to the first aspect.

The kit according to the second aspect may utilize the method according to the first aspect. The skilled person would therefore readily understand that any feature described in combination with the first aspect could also be combined with the second aspect, and vice versa. Accordingly, the remarks set forth above with reference to the first aspect are equally applicable on the second aspect.

In a third aspect, a system for alignment of a receiver charging element of a hearing device and a transmitter charging element of a charger is provided. The hearing device is a custom rechargeable hearing device designed to be worn by a user. The charger comprises a custom insert, wherein the custom insert is configured to receive the hearing device. The system comprises one or more communication interfaces configured to obtaining a digital scan of the user's ear shape; a processing unit configured to creating a digital three-dimensional hearing device model based on the digital scan of the user's ear shape, wherein the processing unit is configured to add the position of the receiver charging element to the digital three-dimensional hearing device model. The one or more communication interfaces are also configured to provide a digital three-dimensional charger model. The processing unit is also configured to add the position of the transmitter charging element to the digital three-dimensional charger model. The one or more communication interfaces are also configured to provide a generic digital three-dimensional insert model. The processing unit is also configured to create a digital cavity in the generic digital three-dimensional insert model, the digital cavity being created based on the digital three-dimensional hearing device model to thereby obtain a custom digital three-dimensional insert model, the cavity being configured to receive the hearing device. The processing unit is also configured to ensuring alignment between the receiver charging element in the digital three-dimensional hearing device model and the transmitter charging element in the three-dimensional charger model to thereby maximize coupling between the receiver charging element and the transmitter charging element.

In some embodiments, the one or more communication interfaces comprise an interface for accessing a storage medium, a user interface, or a combination of the foregoing.

In a fourth aspect, a non-transitory computer-readable medium stores a set of instructions, an execution of which by a processing unit will cause a method of alignment of a receiver charging element of a hearing device and a transmitter charging element of a charger. The hearing device is a custom rechargeable hearing device designed to be worn by a user. The charger comprises a custom insert, wherein the custom insert is configured to receive the hearing device. The method comprises:

obtaining a digital scan of the user's ear shape;
creating a digital three-dimensional hearing device model based on the digital scan of the user's ear shape, the position of the receiver charging element is configured to be added to the digital three-dimensional hearing device model;
providing a digital three-dimensional charger model, the position of the transmitter charging element is configured to be added to the digital three-dimensional charger model;
providing a generic digital three-dimensional insert model;
creating a digital cavity in the generic digital three-dimensional insert model, the digital cavity being created based on the digital three-dimensional hearing device model to thereby obtain a custom digital three-dimensional insert model, the cavity being configured to receive the hearing device; and
ensuring alignment between the receiver charging element in the digital three-dimensional hearing device model and the transmitter charging element in the three-dimensional charger model to thereby maximize coupling between the receiver charging element and the transmitter charging element.

The present disclosure relates to different aspects including the method described above and in the following, and a corresponding kit, a system, and a non-transitory computer-readable medium, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
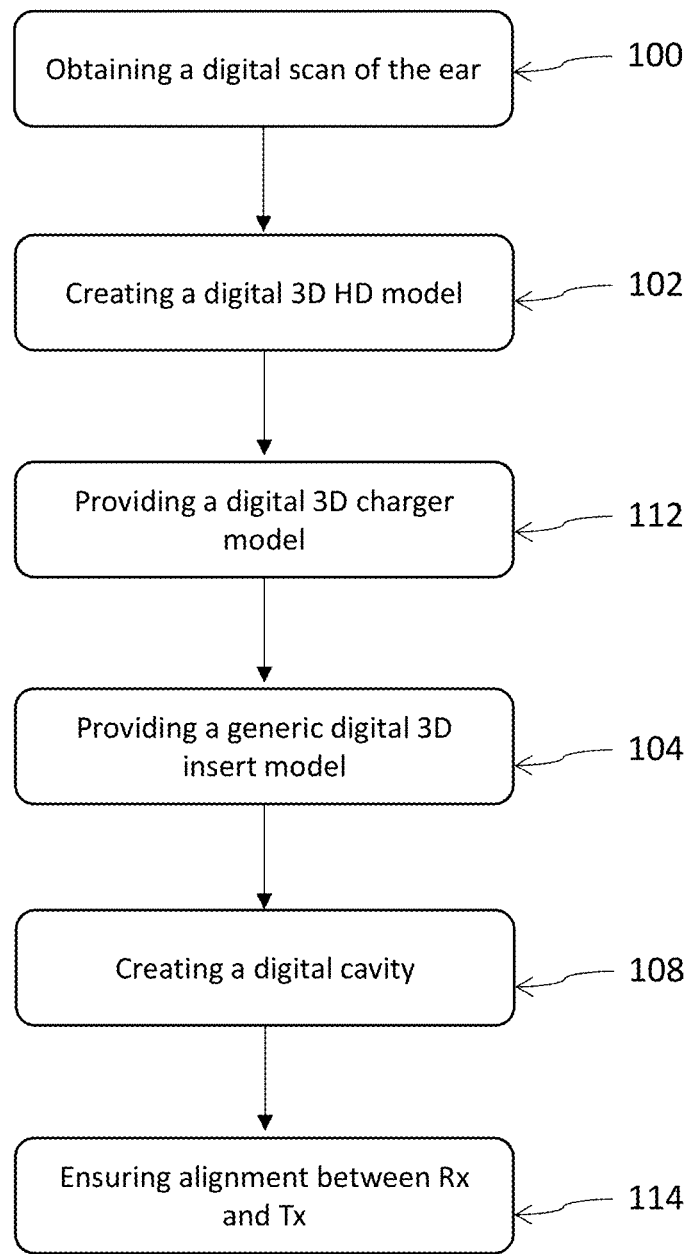
FIG. 1 schematically illustrates a method for alignment of a receiver charging element of a hearing device and a transmitter charging element of a charger, FIG. 2 schematically illustrates a kit comprising a charger and a hearing device, FIGS. 3a-3c schematically illustrate various embodiments of alignment of a receiver charging element and a transmitter charging element, FIG. 4 schematically illustrates creation of a digital cavity in a generic digital 3D insert model, FIG. 5 schematically illustrates an exemplary method for alignment of charging elements of a hearing device and a charger, FIG. 6 schematically illustrates an exemplary method for alignment of charging elements of a hearing device and a charger.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates a method for alignment of a receiver charging element Rx of a hearing device, such as a hearing aid, and a transmitter charging element Tx of a charger. The hearing device is a custom rechargeable hearing device designed to be worn by a user. The charger comprises a custom insert which is configured to receive the hearing device. The method comprises at first obtaining 100 a digital scan of the user's ear shape. The method further comprises creating 102 a digital 3D hearing device model based on the digital scan of the user's ear shape. In this step, the position of the receiver charging element may be added to the digital three-dimensional hearing device model. The method further comprises providing or obtaining 112 a digital 3D charger model. In this step, the position of the transmitter charging element may be added to the digital 3D charger model. The method further comprises providing or obtaining 104 a generic digital 3D insert model and creating 108 a digital cavity in the generic digital 3D insert model. The digital cavity is created based on the digital 3D hearing device model to thereby obtain a custom digital 3D insert model. The cavity is configured to receive the hearing device. Finally, the method comprises ensuring 114 alignment between the receiver charging element in the digital 3D hearing device model and the transmitter charging element in the 3D charger model to thereby maximize coupling between the receiver charging element and the transmitter charging element.

Figure 2:
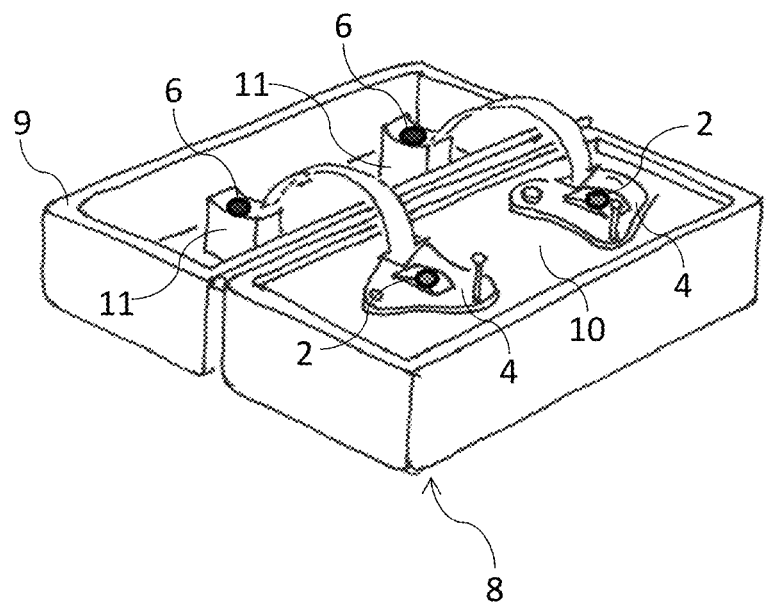

FIG. 2 schematically illustrates a kit comprising a charger 8 and two hearing devices 4, such as two hearing aids. The hearing devices 4 comprise a receiver charging element 2 and the charger 8 comprises two transmitter charging elements 6. The hearing devices 4 are custom rechargeable hearing devices designed to be worn by a user. The charger 8 comprises a custom insert 10. The custom insert 10 is configured to receive the hearing devices 4. According to this exemplary kit, the charger 8 comprises a lid 9. The lid 9 may comprise charging towers 11. The transmitter charging elements 6 are comprised in the charging towers 11. The receiver charging elements 2 and the transmitter charging elements 6 are aligned. Therefore, when the lid 9 is closed, the hearing devices 4 are efficiently charged, with a charging efficiency as high as 20%, such as 25%, such as 30%, and such as 35% or more.

The arrows are for indicating that the lid 9 can be moved in the direction of the arrows for closing the charger 8 when the hearing devices 4 should be charged.

In FIG. 2, two hearing devices 4 are shown, and accordingly each hearing device 4 has a receiver charging element 2. The charger 8 therefore has two transmitter charging elements 6 for charging each of the two receiver charging elements 2, respectively.

In FIG. 2, each hearing device 4 has a receiver charging element 2, and when the lid 9 of the charger 8 is closed, the transmitter charging elements 6 are moved to a charging position where each receiver charging element 2 is aligned with a corresponding transmitter charging element 6 in the lid 9. If the charger 8 is configured for receiving only one hearing device 4, then there may be only one transmitter charging element 6 in the charger 8, where the transmitter charging element 6 is configured to be aligned with the receiver charging element 2 of the hearing device 4, when the hearing device 4 is placed in the charger 8.

Figure 3:
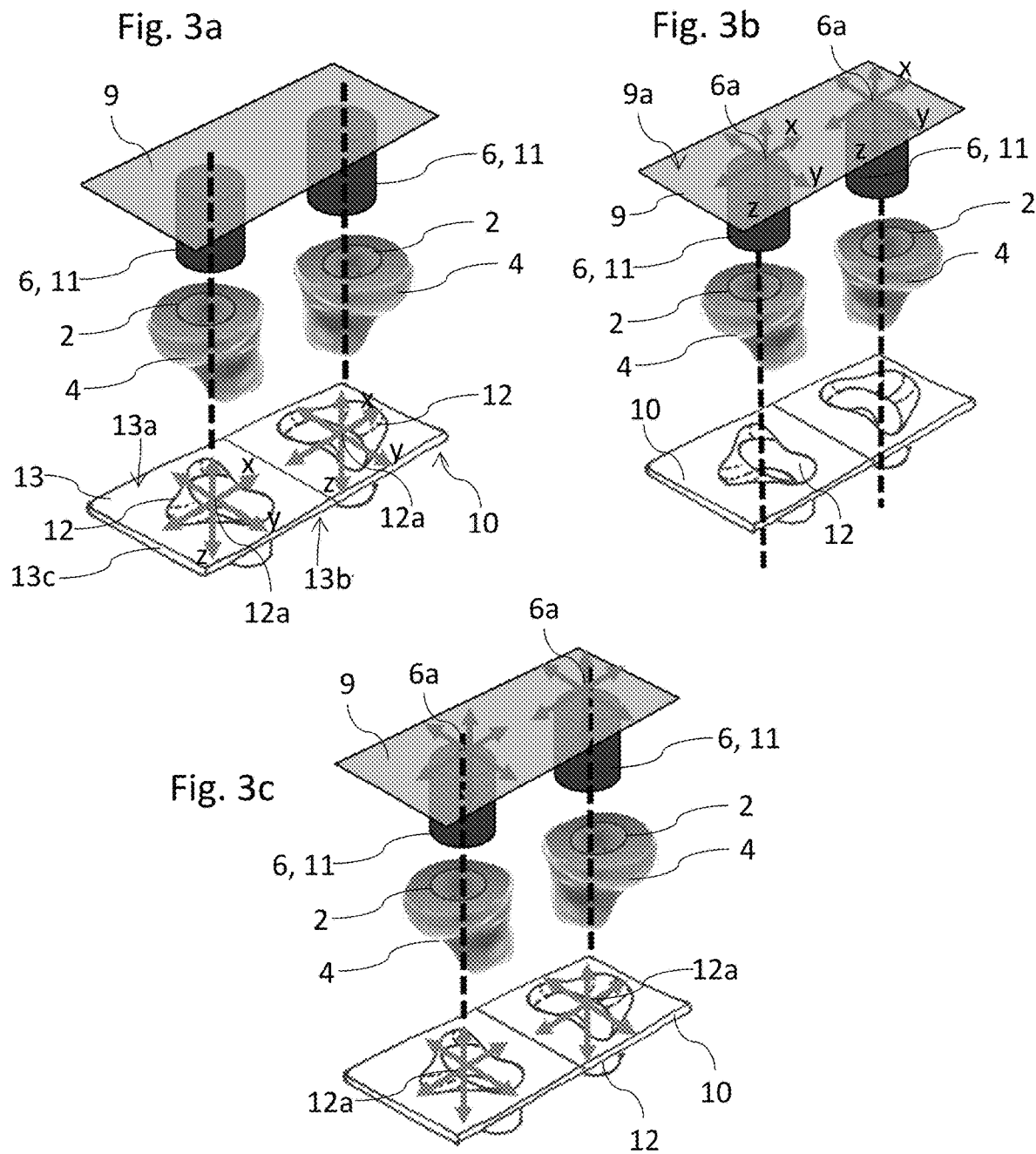

FIG. 3 schematically illustrates various embodiments of alignment of a receiver charging element 2 and a transmitter charging element 6.

FIG. 3a schematically illustrates a charger lid 9 of a charger (not shown) with two charging towers 11, two hearing devices 4 comprising the receiver charging elements 2, and the custom insert 10 of the charger (not shown). The custom insert 10 comprises a flat structure 13 extending in a xy plane, the flat structure 13 having a top surface 13a, a bottom surface 13b, and a peripheral rim 13c, where cavities 12 extend away from the bottom surface 13b of the custom insert 10. The peripheral rim 13c of the custom insert 10 is configured to cooperate with a rim of the charger (not shown). The rim of the charger may be an inside rim defining a cavity within the charger. Each charging tower 11 comprise a transmitter charging element 6. In this embodiment, the charging towers 11, and the transmitter charging elements 6, are stationary, i.e. their position is not adjustable, or their position is not adjusted during the present method or process. The alignment may be achieved by controlling the position of the receiver charging element 2 of the hearing device 4 which may be achieved by controlling the position of the cavities 12 in the custom insert 10, as indicated with arrows 12a, e.g. by moving the digital cavities 12 in the custom insert 10 in a x, y and/or z direction relative to the xy plane. Positioning of the digital cavities 12 may be performed during the digital modelling phase and may include digitally moving the digital cavities 12 in a x, y and/or z direction relative to the xy plane, etc. A result of the digital cavity positioning is that the position of the receiver charging elements 2 with respect to the transmitter charging elements 6 is controlled and changed. Adjusting the position of the receiver charging elements may be performed by adjusting the position of the receiver charging elements in at least one of x or y or z directions by controlling the position of the digital cavities 12 in the custom insert 10, as indicated by the arrows 12a (x-y-z arrows). By controlling the position of the receiver charging elements 2 relative to the transmitter charging elements 6, alignment between the two is achieved and thereby the efficiency of the charging process is increased. The digital cavity positioning may be performed by the specialized software program and typically before the custom insert 10 is manufactured.

FIG. 3b schematically illustrates a charger lid 9 with two charging towers 11, two hearing devices 4 comprising the receiver charging elements 2 and the custom insert 10. The lid 9 comprises an inner surface 9a extending in a xy plane. The xy plane may be a substantially flat plane or a curved plane. In this embodiment, the charging towers 11, and/or the transmitter charging elements 6, may be repositioned, as indicated by arrows 6a. Adjusting the position of the transmitter charging elements 6 may be performed by reposition of the transmitter charging elements 6 in at least one of x or y or z directions relative to the xy plane and/or by reposition of charging towers 11 in at least one of x or y or z directions relative to the xy plane and/or along the inner surface 9a, as indicated by arrows 6a (x-y-z arrows). This adjustment of the charging towers 11 and/or the transmitter charging elements 6 may be performed manually with an external tool, or with an adjustment tool placed in the charger. The position of the transmitter charging elements 6 may be digitally adjusted/determined. Furthermore, the transmitter charging elements 6 may be manually adjusted to the determined position during the manufacturing process to obtain better charging efficiency. Alternatively, the transmitter charging elements 6 may be adjusted completely manually by an operator. The transmitter charging elements 6 may be moved in some or all three directions at the same time. The transmitter charging elements 6 may be moved by moving/repositioning the charging towers 11 in any direction. This large freedom in positioning of the transmitter charging elements 6 in the charging towers 11 and/or the charging towers 11 in the charger lid 9 allows for further improvements in charging efficiency and power consumption. The position of the receiver charging elements 2 of the hearing device 4 may be defined by the position of the cavity 12 in the custom insert 10.

FIG. 3c illustrates a combination of FIGS. 3a and 3b. According to this embodiment, the alignment between the corresponding charging elements 6, 2 is achieved by both repositioning the transmitter charging element 6 and/or by repositioning of the charging towers 11, as indicated by arrows 6a, and by repositioning of the receiver charging elements 2 by repositioning the cavity 12, as indicated by arrows 12a. In one embodiment, a first repositioning step is made according to the description of FIG. 3a and a following second repositioning step is made according to the description of FIG. 3b. Hereby is obtained a fine tuning of the positioning of the transmitter charging elements 6 and the receiver charging elements 2 relative to each other.

Figure 4:
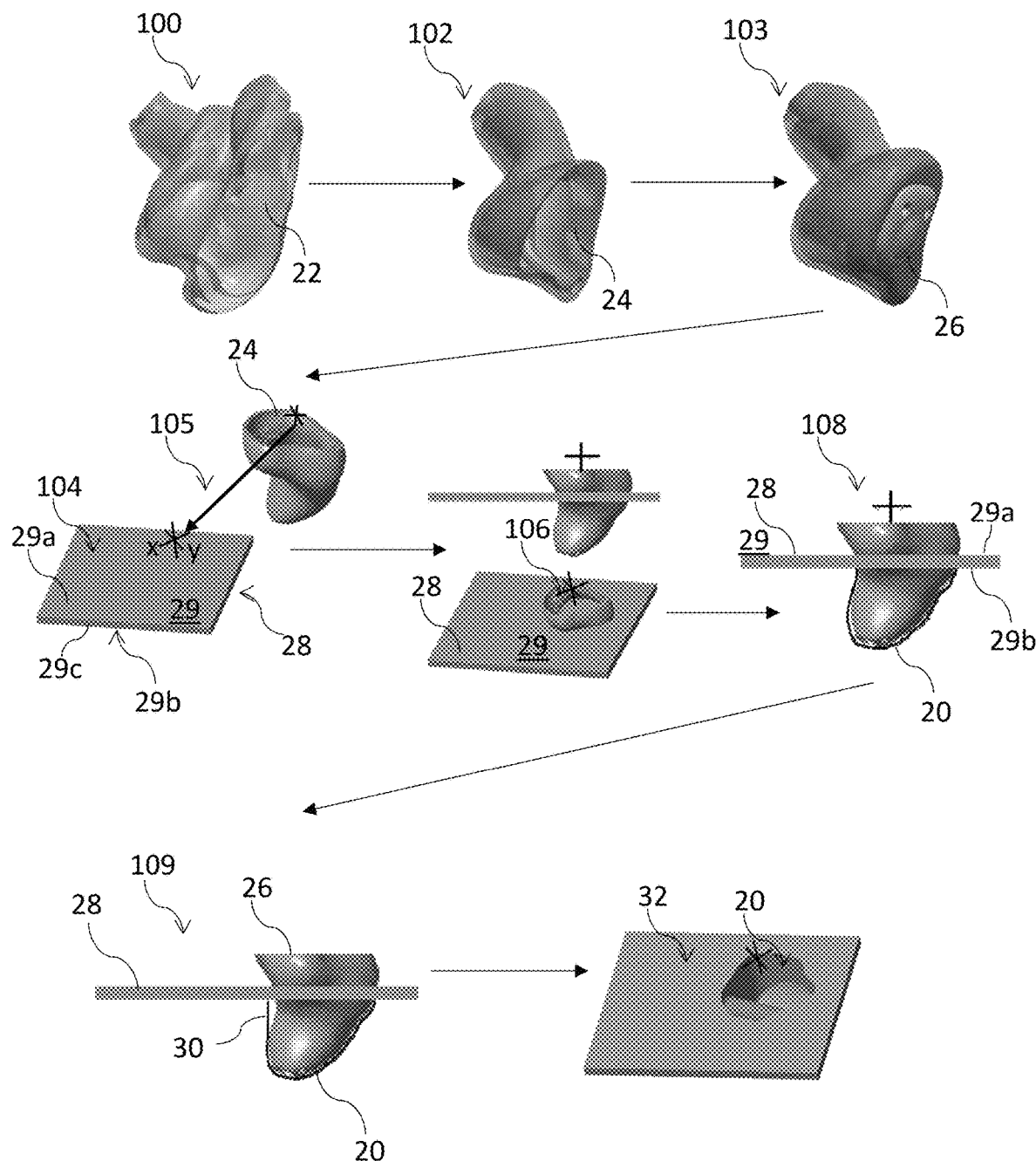

FIG. 4 illustrates an exemplary method for creation of a digital cavity 20 in a generic digital 3D insert model 28, i.e. configuring a custom insert, as shown in FIG. 3, to be made. The digital cavity 20 may be created by using a specialized software program.

In order to create a digital cavity 20 in the generic digital 3D insert model 28, a digital scan 22 of the user's ear shape is first obtained 100. The digital scan 22 comprises a 3D representation of at least a part of the outer ear, such as at least a part of the ear canal and the concha.

Based on the digital scan 22 of the user's ear shape, a digital 3D hearing device model 24 is created 102. The digital 3D hearing device model 24 is a geometrical representation of the ear surfaces and further a shell of the hearing device. Once the digital 3D hearing device model 24 is created 102, the position of a receiver charging element is added 103 to the digital 3D hearing device model 24 to thereby obtain a complete model 26. Typically, the receiver charging element is arranged in a faceplate together with other electronic components of the hearing device. The position of the receiver charging element may be determined on the basis of miniaturization rules and geometry of the hearing device shell.

A generic digital 3D insert model 28 is then provided 104 or obtained. The generic digital 3D insert model 28 may comprise a flat 3D structure 29 extending in a xy plane, the flat 3D structure 29 having a top surface 29a, a bottom surface 29b, and a peripheral rim 29c. In addition, a digital 3D charger model together with the position of a transmitter charging element is also provided or obtained (not shown). The peripheral rim 29c of the flat 3D structure 29 may be configured to cooperate with a rim of the digital 3D charger model (not shown). The digital 3D hearing device model 24 or 26 which includes the position of the receiver charging element is then placed 105 in the generic digital 3D insert model 28. The digital 3D charger model (not shown) including the position of the transmitter charging element (not shown) is also placed 106 in the generic 3D insert model 28 to define the location of the digital cavity in the generic 3D insert model 28. The digital cavity 20 is then created 108 in the generic 3D insert model 28. The digital cavity 20 is created based on the complete digital 3D hearing device model 26. The digital cavity 20 may extend away from the bottom surface 29b of the flat 3D structure 29. In one embodiment, the digital cavity 20 may be further modified by digitally removing 109 one or more undercuts/negative draft 30 in the digital 3D insert model 28. By digitally removing 109 any undercuts or negative drafts 30, it is ensured that the hearing device can be placed and removed from the cavity. If any undercuts or negative drafts 30 are not removed, the hearing device cannot be placed or removed from the cavity, as material in the insert is blocking the free passage of the hearing device in the cavity. At the end, the digital cavity 20 with well-defined cavity surfaces is created thereby defining a digital custom insert 32.

Figure 5:
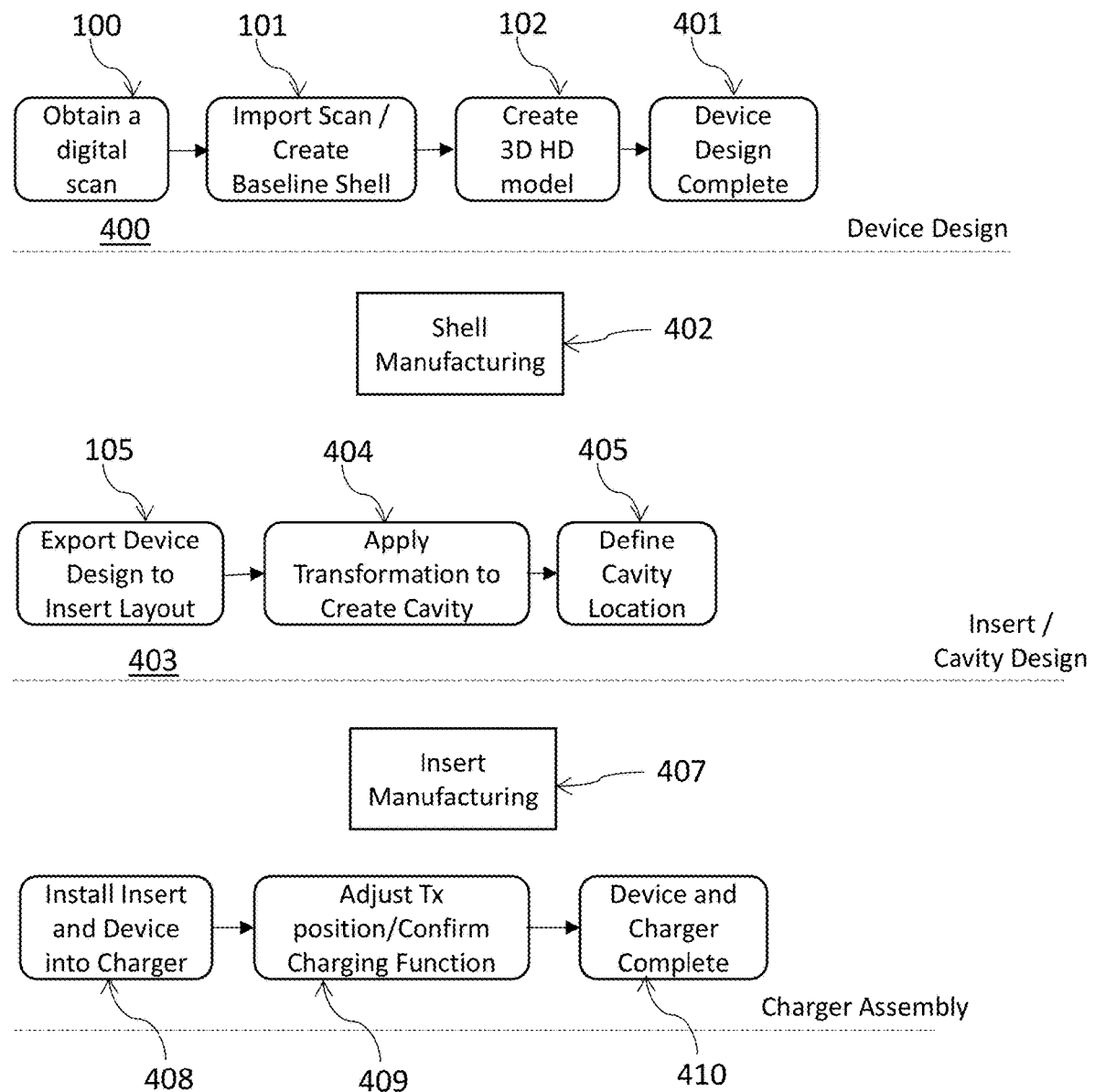

FIG. 5 schematically illustrates an exemplary method for alignment of charging elements of a hearing device and a charger. According to this embodiment, a hearing device is first designed 400. To design the hearing device, a digital scan of the user's ear shape is first obtained 100. The digital scan is then imported 101 into a specialized software program and a baseline shell is created 101 based on the digital scan. The baseline shell is then further redesigned based on the digital scan to thereby create a digital 3D hearing device model. The hearing device design is then complete 401 and the shell of the hearing device may be manufactured 402 based on the hearing device design. In this embodiment, the position of the receiver charging element is defined by an operator. Namely, the operator has a complete freedom during the hearing device assembly to modify the shell and position a faceplate and thereby the receiver charging element in any position to minimize the device size.

In order to design a digital cavity and a digital custom insert 403, the digital 3D hearing device model is exported 105 into an insert layout, i.e. into a generic digital 3D insert model. The generic digital 3D insert model is transformed 404 to create a digital cavity and the location of the cavity is defined 405. The transformation is performed based on the digital 3D hearing device model and the location of the digital cavity may be based on the position of a representation of the transmitter charging element in the digital 3D charger model.

Once the custom insert is manufactured, it can be installed into the charger, 408. The hearing device to be charged may also be inserted into the custom insert. According to this embodiment, the position of the transmitter charging element can be adjusted 409 and the charging function may be confirmed. According to this embodiment, alignment between the receiver charging element and the transmitter charging element is obtained by adjusting the position of the transmitter charging element. The hearing device and the charger are then complete 410 and ready for shipment.

This embodiment allows for maximum miniaturization of the hearing device and the charger.

Figure 6:
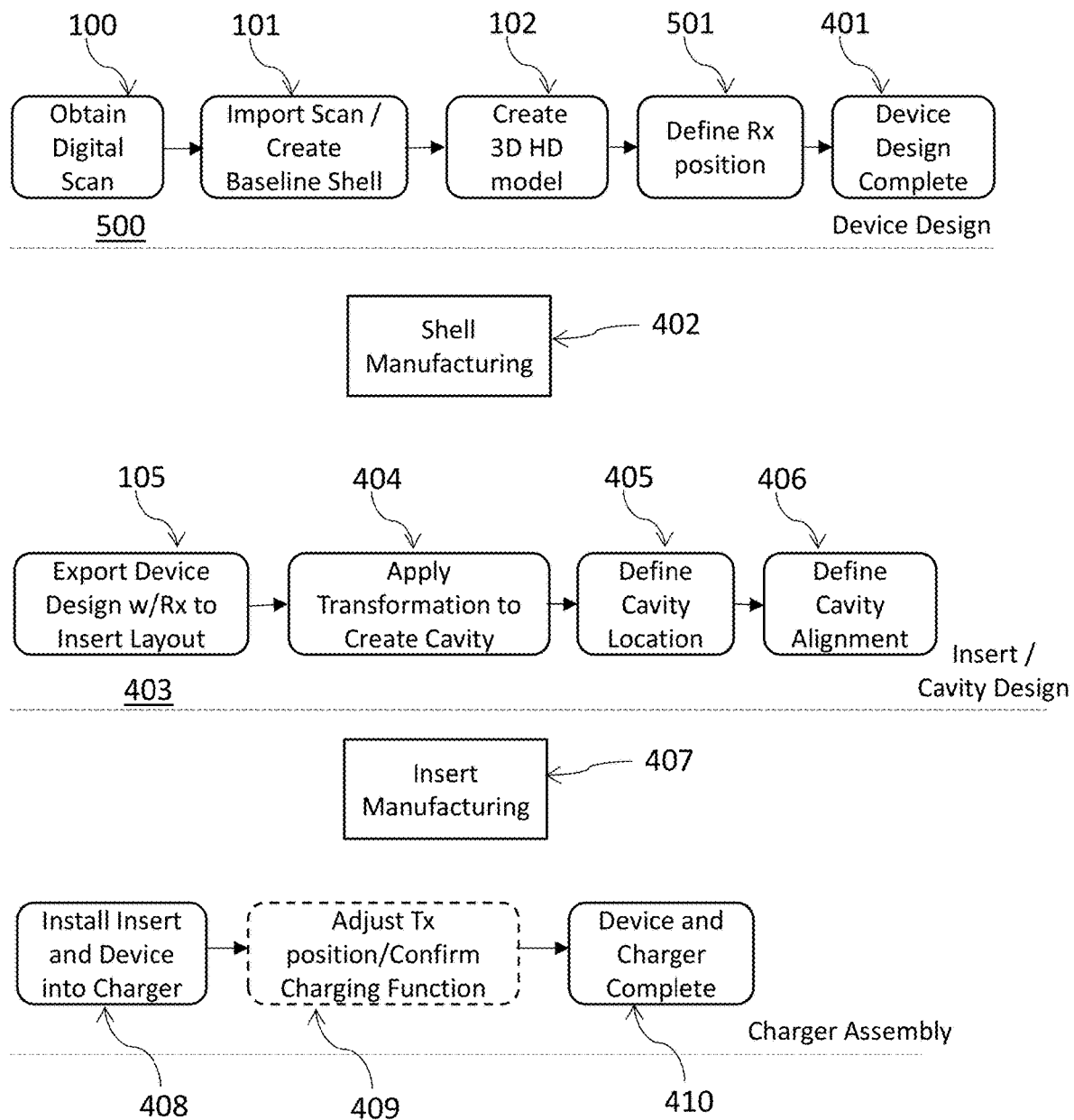

FIG. 6 schematically illustrates an exemplary method for alignment of charging elements of a hearing device and a charger. The difference between this embodiment and the embodiment illustrated in FIG. 5 is in that the position of the receiver charging element is defined 501 during the device design process 500 and that the digital 3D hearing device model is exported 105 into an insert layout, i.e. into a generic digital 3D insert model with/comprising a representation of the position of the receiver charging element defined in 501. Furthermore, a final step in the digital cavity creation is; defining the digital cavity alignment 406 which tunes the position of the representation of the receiver charging element and the representation of the transmitter charging element to thereby align the two charging elements in the hearing device and the charger. After this step, the custom insert may be manufactured 407. Furthermore, according to this embodiment, step 409 is optional, i.e. the position of the transmitter charging element may be adjusted 409 and the charging function may be confirmed. Alternatively, only the charging function may be confirmed. According to this embodiment, the operator assembling the hearing device has almost no freedom to modify the shell and the faceplate in order to minimize the hearing device. Thus, according to the method of FIG. 6, the alignment between the transmitter charging element and the receiver charging element may be obtained by digital modelling of the position of the hearing device in the insert and/or by positioning of the transmitter charging element in the charger.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

The embodiments may be provided according to any one or any combination of the following items:

1. A method for alignment of a receiver charging element of a hearing device and a transmitter charging element of a charger, the hearing device being a custom rechargeable hearing device designed to be worn by a user, the charger comprising a custom insert, the custom insert being configured to receive the hearing device, the method comprising:
    obtaining a digital scan of the user's ear shape;
    creating a digital three-dimensional hearing device model based on the digital scan of the user's ear shape, the position of the receiver charging element is configured to be added to the digital three-dimensional hearing device model;
    providing a digital three-dimensional charger model, the position of the transmitter charging element is configured to be added to the digital three-dimensional charger model;
    providing a generic digital three-dimensional insert model;
    creating a digital cavity in the generic digital three-dimensional insert model, the digital cavity being created based on the digital three-dimensional hearing device model to thereby obtain a custom digital three-dimensional insert model, the cavity being configured to receive the hearing device; and
    ensuring alignment between the receiver charging element in the digital three-dimensional hearing device model and the transmitter charging element in the three-dimensional charger model to thereby maximize coupling between the receiver charging element and the transmitter charging element.

2. A method according to item 1, wherein the method further comprises controlling the position of the receiver charging element in the digital three-dimensional hearing device model with respect to the position of the transmitter charging element.

3. A method according to item 2, wherein the custom digital three-dimensional insert model is defined by a top surface extending through a plane, wherein the position of the receiver charging element is controlled by controlling the position of the digital cavity along a direction parallel to the plane of the custom digital three-dimensional insert model.

4. A method according to any of the preceding items, wherein the method further comprises adjusting the position of the transmitter charging element with respect to the receiver charging element.

5. A method according to item 4, wherein adjusting the position of the transmitter charging element is performed by adjusting the position of the transmitter charging element in at least one of x or y or z directions.

6. A method according to any of the preceding items, wherein the method further comprises creating a digital three-dimensional gap in the digital cavity of the digital three-dimensional custom insert model, the digital three dimensional gap defining an air gap between the digital cavity and the digital three-dimensional hearing device model.

7. A method according to any of the preceding items, wherein the hearing device is an inductively chargeable hearing device.

8. A method according to any of the preceding items, wherein the receiver charging element is a receiver coil, and the transmitter charging element is a transmitter coil.

9. A method according to any of the preceding claims, wherein the custom insert is configured to have a first cavity and a second cavity for receiving a first custom rechargeable hearing device and a second custom rechargeable hearing device, respectively.

10. A method according to any of the preceding items, wherein the hearing device comprises a faceplate, the faceplate comprising the receiver charging element.

11. A method according to any of the preceding claims, wherein the charger comprises a lid.

12. A method according to any of the preceding items, wherein the charger lid comprises at least one charging tower, the charging tower comprising the transmitter charging element.

13. A method according to any of the preceding items, wherein creating the digital cavity for receiving the hearing device in the custom digital three-dimensional insert model comprises digitally removing one or more undercuts/negative draft in the digital cavity.

14. A kit comprising a charger and a hearing device, the charger comprising a transmitter charging element and a custom insert being configured to receive the hearing device, the hearing device comprising a receiver charging element, the hearing device being a custom rechargeable hearing device designed to be worn by a user, wherein the transmitter charging element and the receiver charging element are aligned using the method according to any of the preceding items.

15. A system for alignment of a receiver charging element of a hearing device and a transmitter charging element of a charger, the hearing device being a custom rechargeable hearing device designed to be worn by a user, the charger comprising a custom insert, the custom insert being configured to receive the hearing device the system comprising:
one or more communication interfaces configured to obtaining a digital scan of the user's ear shape;
a processing unit configured to creating a digital three-dimensional hearing device model based on the digital scan of the user's ear shape, wherein the processing unit is configured to add the position of the receiver charging element to the digital three-dimensional hearing device model;
wherein the one or more communication interfaces are also configured to providing a digital three-dimensional charger model, wherein the processing unit is also configured to add the position of the transmitter charging element to the digital three-dimensional charger model;
wherein the one or more communication interfaces are also configured to providing a generic digital three-dimensional insert model;
wherein the processing unit is also configured to creating a digital cavity in the generic digital three-dimensional insert model, the digital cavity being created based on the digital three-dimensional hearing device model to thereby obtain a custom digital three-dimensional insert model, the cavity being configured to receive the hearing device; and wherein the processing unit is also configured to ensuring alignment between the receiver charging element in the digital three-dimensional hearing device model and the transmitter charging element in the three-dimensional charger model to thereby maximize coupling between the receiver charging element and the transmitter charging element.

16. The system according to item 15, wherein the one or more communication interfaces comprise an interface for accessing a storage medium, a user interface, or a combination of the foregoing.

17. A non-transitory computer-readable medium storing a set of instructions, an execution of which by a processing unit will cause a method of alignment of a receiver charging element of a hearing device and a transmitter charging element of a charger, the hearing device being a custom rechargeable hearing device designed to be worn by a user, the charger comprising a custom insert, the custom insert being configured to receive the hearing device, the method comprising:
obtaining a digital scan of the user's ear shape;
creating a digital three-dimensional hearing device model based on the digital scan of the user's ear shape, the position of the receiver charging element is configured to be added to the digital three-dimensional hearing device model;
providing a digital three-dimensional charger model, the position of the transmitter charging element is configured to be added to the digital three-dimensional charger model;
providing a generic digital three-dimensional insert model;
creating a digital cavity in the generic digital three-dimensional insert model, the digital cavity being created based on the digital three-dimensional hearing device model to thereby obtain a custom digital three-dimensional insert model, the cavity being configured to receive the hearing device; and
ensuring alignment between the receiver charging element in the digital three-dimensional hearing device model and the transmitter charging element in the three-dimensional charger model to thereby maximize coupling between the receiver charging element and the transmitter charging element.

LIST OF REFERENCES 2 receiver charging element
4 hearing device
6 transmitter charging element
8 charger
9 charger lid
10 custom insert
11 charging towers
12 cavity
13 flat structure of the custom insert
13a top surface of the flat structure
13b bottom surface of the flat structure
13c peripheral rim of the flat structure
20 digital cavity
22 digital scan
24 digital 3D hearing device model
26 complete digital 3D hearing device model
28 generic 3D insert model
29 flat 3D structure of the generic 3D insert model
29a top surface of the flat 3D structure
29b bottom surface of the flat 3D structure
29c peripheral rim of the flat 3D structure
30 undercut/negative draft
32 digital custom insert
100 obtaining a digital scan of the user's ear shape
101 importing a digital scan/creating baseline shell
102 creating a digital 3D hearing device model
103 adding the position of the receiver charging element
104 providing a generic digital 3D insert model
105 placing a digital 3D hearing device model in a generic digital 3D insert model
106 placing a digital 3D charger model in a generic digital 3D insert model
108 creating a digital cavity
109 digitally removing undercuts/negative drafts
112 providing a digital 3D charger model
114 ensuring alignment between a receiver and transmitter charging element
400 hearing device design
401 hearing device design complete
402 hearing device shell manufacturing
403 designing a digital cavity and a digital 3D custom insert
404 applying transformations to create a digital cavity
405 defining a digital cavity location
406 digital cavity alignment
407 manufacturing a custom insert
408 installing a custom insert into a charger
409 adjusting the position of a transmitter charging element
410 hearing device and charger complete
500 hearing device design
501 defining the position of a receiver charging element

The invention claimed is:

1. A method of configuring an insert to be made, the insert being a part of a charger, wherein the insert is for receiving a hearing device having a first charging element, and is for aligning the hearing device and the charger, the charger having a second charging element, the hearing device being a rechargeable hearing device configured to be worn by a user, the method comprising:
obtaining a digital three-dimensional hearing device model, the digital three-dimensional hearing device model comprising a representation of the first charging element;
obtaining a digital three-dimensional charger model, the digital three-dimensional charger model comprising a representation of the second charging element;
creating a digital three-dimensional insert model to align (1) the representation of the first charging element in the digital three-dimensional hearing device model and (2) the representation of the second charging element in the three-dimensional charger model.

2. The method according to claim 1, wherein a position of the representation of the first charging element in the digital three-dimensional hearing device model with respect to the representation of the second charging element is adjustable.

3. The method according to claim 2, wherein the position of the representation of the first charging element in the digital three-dimensional hearing device model with respect to the representation of the second charging element is adjustable by changing a position of a digital cavity relative to a part of the digital three-dimensional insert model.

4. The method according to claim 1, wherein the act of creating comprises changing a position of a digital cavity relative to a part of the digital three-dimensional insert model.

5. The method according to claim 1, further comprising changing a relative position between the representation of the second charging element and the representation of the first charging element.

6. The method according to claim 1, further comprising changing a relative position between a digital cavity and a part of the digital three-dimensional charger model.

7. The method according to claim 1, wherein the digital three-dimensional insert model comprises a digital cavity, and wherein the method further comprises increasing a size of the digital cavity of the digital three-dimensional insert model.

8. The method according to claim 1, wherein the hearing device is an inductively chargeable hearing device.

9. The method according to claim 1, wherein the first charging element is a receiver coil, and the second charging element is a transmitter coil.

10. The method according to claim 1, wherein the insert has a first cavity for receiving the rechargeable hearing device, and a second cavity for receiving an other rechargeable hearing device.

11. The method according to claim 1, wherein the hearing device comprises a faceplate, the faceplate comprising the first charging element.

12. The method according to claim 11, wherein the charger lid comprises at least one charging tower, the charging tower comprising the second charging element.

13. The method according to claim 1, wherein the charger comprises a lid.

14. The method according to claim 1, wherein the act of creating the digital three-dimensional insert model comprises digitally removing one or more undercuts or negative draft in a digital cavity.

15. The method according to claim 1, further obtaining a digital cavity based on the digital three-dimensional hearing device model.

16. The method according to claim 1, wherein a position of the second charging element relative to the charger is adjustable.

17. A kit comprising a charger and a hearing device, the charger comprising an insert configured to receive the hearing device, the hearing device comprising a first charging element, the hearing device being a rechargeable hearing device configured to be worn by a user, wherein the first charging element of the hearing device and a second charging element at the charger are aligned using the method according to claim 1.

18. A system for configuring an insert to be made, the insert being a part of a charger, wherein the insert is for receiving a hearing device having a first charging element, and is for aligning the hearing device and the charger, the charger comprising a second charging element, the hearing device being a rechargeable hearing device configured to be worn by a user, the system comprising:
one or more communication interfaces configured to obtaining a digital three-dimensional hearing device model, the digital three-dimensional hearing device model comprising a representation of the first charging element;
wherein the one or more communication interfaces are also configured to obtain a digital three-dimensional charger model, the digital three-dimensional charger model comprising a representation of the second charging element;
wherein the system further comprises a processing unit configured to create a digital three-dimensional insert model to align (1) the representation of the first charging element in the digital three-dimensional hearing device model and (2) the representation of the second charging element in the three-dimensional charger model.

19. The system according to claim 18, wherein the one or more communication interfaces comprise an interface for accessing a storage medium, a user interface, or a combination of the foregoing.

20. A non-transitory computer-readable medium storing a set of instructions, an execution of which by a processing unit will cause a method of configuring a to-be-made insert to be performed, the insert being a part of a charger, wherein the insert is for receiving a hearing device having a first charging element, and is for aligning the hearing device and the charger, the charger comprising a second charging element, the hearing device being a rechargeable hearing device configured to be worn by a user, the method comprising:
obtaining a digital three-dimensional hearing device model, the digital three-dimensional hearing device model comprising a representation of the first charging element;
obtaining a digital three-dimensional charger model, the digital three-dimensional charger model comprising a representation of the second charging element;
creating a digital three-dimensional insert model to align (1) the representation of the first charging element in the digital three-dimensional hearing device model and (2) the representation of the second charging element in the three-dimensional charger model.

* * * * *